Figure 1:
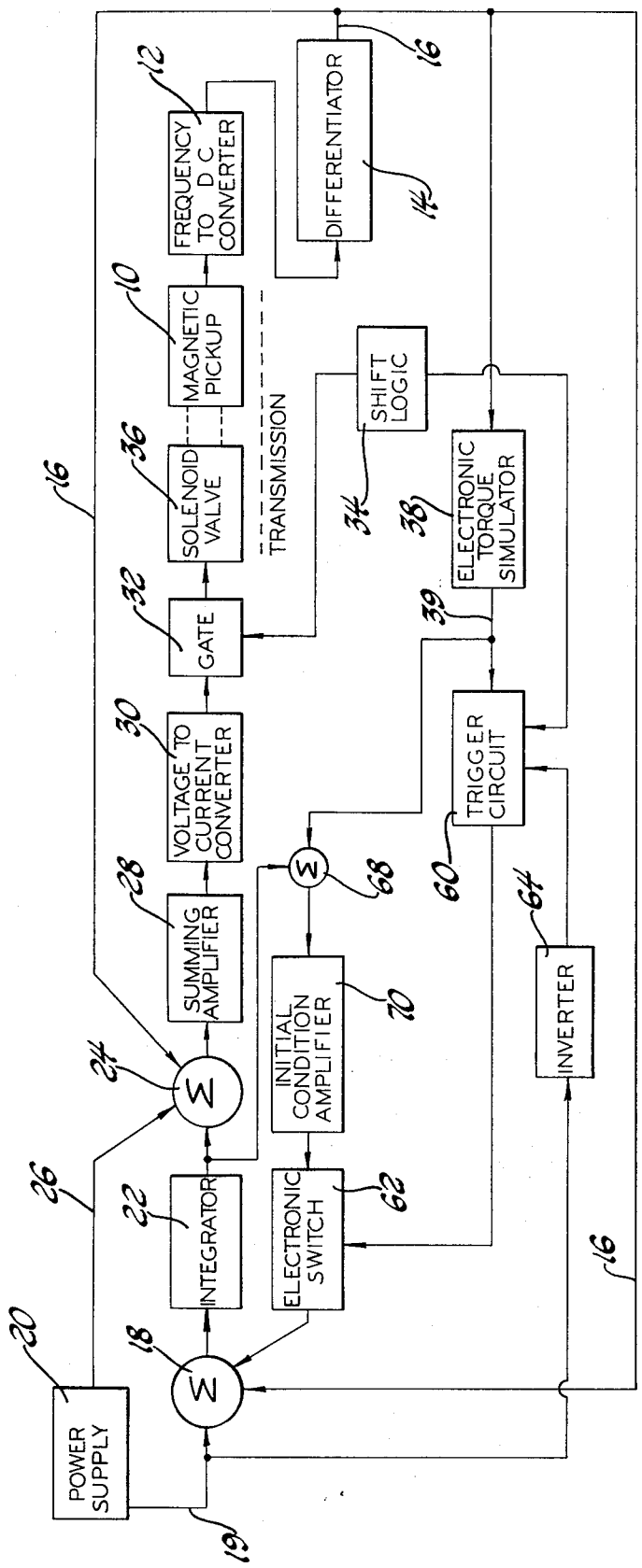

United States Patent [19]
Sprague et al.

[11] 3,719,096
[45] March 6, 1973

[54] ELECTRONIC SHIFT CONTROL FOR A TRANSMISSION

[75] Inventors: Richard L. Sprague; David S. Dennis, both of Anderson, Ind.

[73] Assignee: General Motors Corporation, Detroit, Mich.

[22] Filed: Oct. 27, 1971

[21] Appl. No.: 193,041

[52] U.S. Cl. ................................. 74/752 D, 74/866
[51] Int. Cl. .......................... F16h 3/74, B60k 21/00
[58] Field of Search ............... 74/752 A, 752 D, 866

[56] References Cited

UNITED STATES PATENTS 2,739,679 3/1956 Rendol ............................. 192/54 X
3,439,564 4/1969 Scholl et al. ........................ 74/866
3,572,168 3/1971 Shirai et al. ...................... 74/752 A

*Primary Examiner*—Arthur T. McKeon
*Attorney*—Jean L. Carpenter et al.

[57] ABSTRACT

A transmission having a clutch controlled multi-ratio gear train driven through a torque converter includes an electronic control regulating pressure applied to an oncoming clutch during ratio change. The control primarily regulates the clutch pressure according to a desired acceleration of a rotatable member of the transmission such as a sun gear which accelerates during a shift. However, due to a low responsive characteristic of the torque converter, the initial part of the shift is controlled according to a simulated transmission output torque electronically derived from sun gear acceleration.

4 Claims, 2 Drawing Figures

PATENTED MAR 6 1973    3,719,096

ELECTRONIC SHIFT CONTROL FOR A TRANSMISSION

This invention relates to an electronic shift control for a transmission and particularly to a system for controlling the rate of engagement of a clutch or brake to assure a smooth ratio change. It has been proposed, as, for example, in the patent application of Sanders et al., Ser. No. 147,969, filed May 28, 1971, to control brake or clutch closure rates to effect a smooth shift in a multi-ratio gear train driven directly by the engine, control being based on controlling the engine acceleration to a programmed desired acceleration. When, however, the transmission includes a torque converter between the engine and gear train, the low response characteristics of the torque converter would result in an unstable condition so that rough shifting would ensue.

It is therefore an object of this invention to provide an electronic control for a transmission having a torque converter to effect smooth ratio change.

It is another object of the invention to provide an electronic control for a transmission which takes into account the response characteristics of the transmission torque converter to attain a smooth shift.

The invention is carried out be providing a control to regulate the pressure on a clutch or brake during engagement thereof to cause acceleration of a rotatable member, a circuit for deriving from the member acceleration a simulated gear train output torque signal, a circuit to control the clutch or brake pressure according to the simulated torque signal during the initial portion of the ratio change and a circuit for controlling the pressure according to a desired acceleration of the rotatable member after the initial ratio change. The torque simulating circuit preferably includes a lag network which substantially matches the torque converter characteristics. The invention further includes a circuit for determining the control mode according to the relative values of the simulated torque signal and the programmed acceleration.

Figure 2:
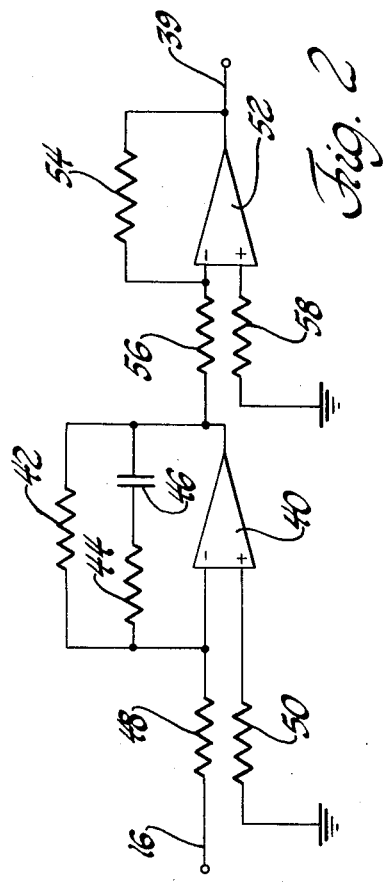

The above and other advantages will become more apparent from the following specification taken in conjunction with the accompanying drawings wherein like reference numerals refer to like parts and wherein:

FIG. 1 is a block diagram of an electronic control system for effecting a smooth ratio change according to the invention; and, FIG. 2 is a schematic diagram of the electronic torque simulating circuit of FIG. 1.

The subject control is applicable to typical automatic transmissions for vehicles which include a torque converter for driving a multiratio gear train wherein the gear train comprises planetary gear sets having their ratio shifted by selective engagement or disengagement of various fluid pressure controlled clutches or brakes herein referred to as torque transmitting devices. An example of such a transmission is shown in the patent to Winchell et al., U.S. Pat. No. 3,321,056. Conventionally, control of the torque transmitting devices is effected by hydraulic control circuits. Incorporation of this invention allows simplification of the hydraulic control and at the same time improves the smoothness of a shift.

According to the control of this invention, it is desired to achieve a smooth shift by regulating the pressure of the oncoming or engaging device in such a manner that the acceleration of a rotatable member of the transmission adheres as nearly as possible to a fixed predetermined rate, thereby assuring optimum smoothness of the change in output torque. In the example of Winchell et al., the sun gear is a suitable rotatable member for providing the acceleration signal, although other members such as the torque converter turbine are useful for the same purpose. When a transmission includes a torque converter, however, the initial part of the ratio shift is effected by the application of a torque transmitting device and concurrently the torque converter winds up. Sun gear acceleration does not directly represent output torque because of the low response characteristics of the torque converter. Accordingly, a simulated output torque signal is used as the control parameter during the initial phase of the shift, and for the final phase of the shift, the sun gear acceleration becomes the control parameter when the output torque signal becomes nearly equal to the acceleration signal.

The subject control system is suitable for controlling each of the phase upshifts and downshifts occurring in an automatic transmission. However, to simplify and clarify the drawings and description it is here set forth as applied only to a single shift.

FIG. 1 is a block diagram of the control system and includes a magnetic pickup 10 which senses the rotation of the sun gear or other transmission rotatable member which experiences an acceleration during a shift. The output of the magnetic pickup is an alternating current signal having a frequency proportional to sun gear speed. That frequency signal is fed to a frequency-to-DC converter 12 which produces a DC analog signal proportional to sun gear speed. The analog signal is operated upon by a differentiator 14 which produces an output signal on line 16 proportional to sun gear acceleration. Line 16 is connected to a summing junction 18 where it is subtracted from an acceleration reference signal on line 19 from a power supply 20. The acceleration reference signal is preset at that level which represents the desired acceleration rate of the sun gear. The differential combination of the sun gear acceleration signal and the acceleration reference signal then represents the acceleration error which is fed to an integrator 22. The integrator error signal is then fed to a second summing junction 24 where it is combined with the sun gear acceleration signal on line 16 and an offset signal on line 26 from the power supply. The sun gear acceleration signal is subtracted from the integrator output in the summing junction 24 to provide a very rapid response to the control loop to the changes in sun gear acceleration. The offset signal is a fixed voltage sufficient in the absence of other input signals to establish enough current in the solenoid valve to be described to give the torque transmitting device the capacity to cause a greater sun gear acceleration than is required. The output of the summing junction 24 is connected to an amplifier 28 which in turn is connected to a voltage-to-current amplifier 30. The current output is then fed to a gate 32 which is controlled by a shift logic circuit 34. The shift logic circuit may be controlled manually or, in a fully automatic transmission, may be controlled electronically as, for example, in the patent to Nelson U.S. Pat. No. 3,448,640. The purpose of the shift logic is to signify shift initiation.

In the normal control mode, the gate 32 will pass the output current from the converter 30 to a solenoid valve 36 which controls the pressure applied to the engaging torque transmitting device. The gate 32, however, is capable of turning the solenoid current fully on or off. The solenoid valve 36 is a well known type of valve exemplified by Schaeffer U.S. Pat. No. 3,225,619. The valve produces an output pressure substantially proportional to solenoid current except for an offset at zero pressure. It is partly for this reason that the offset signal on line 26 is provided. Therefore, the solenoid valve output pressure and the pressure available to the engaging torque transmitting device is a direct function of the output signal of the integrator 22 as combined with the sun gear acceleration and the offset signal in the summing junction 24. The controlled pressure from the solenoid valve affects the degree of engagement of the torque transmitting device which in turn controls the acceleration of the sun gear. The circuit thus far described provides a closed loop control having a high gain due to the action of the integrator 22 and having a rapid response due to the acceleration feedback to the junction point 24. This high gain control loop is effective to accurately control the sun gear acceleration to the level requested by the acceleration reference signal and is similar to that as shown in the control circuit which is more fully set forth in the application of Sanders et al., Ser. No. 147,969.

A secondary control loop which includes the components thus far described is provided for controlling the initial phase of the shift. An electronic torque simulator 38 is a filter circuit whose output voltage on line 39 is in phase with the torque existing in the transmission output shaft during shifting. Its input is the sun gear acceleration on line 16 and its output voltage amplitude is proportional to the transmission output torque. This conversion is necessary to account for the low response characteristics of a conventional automatic transmission torque converter. As shown in FIG. 2, the electronic torque simulator comprises a lag network made up of an operational amplifier 40 having two feedback paths in parallel from its output to its negative input terminal. One of the paths includes a resistor 42 while the other includes a resistor 44 in series with capacitor 46 which, of course, provides a lag characteristic. The negative input terminal is connected through input resistor 48 to the line 16 while the positive input terminal is connected through resistor 50 to ground. The output of the operational amplifier is connected to a conventional unity gain inverter which comprises an operational amplifier 52 with a feedback resistor 54 connected to its negative input terminal, which terminal is also connected through an input resistor 56 to the output of the operational amplifier 40. Its positive terminal is connected through a resistor 58 to ground.

The output of the electronic torque simulator is fed to a trigger circuit 60. One input of the trigger circuit is connected to the shift logic circuit 34 so that when a shift is initiated, the trigger circuit will be turned on to produce an output signal which is fed to an electronic switch 62. The acceleration reference signal on line 19 is inverted by an inverter 64 to provide a trigger reference signal which forms another input of the trigger circuit 60. The trigger compares the electronic torque, i.e., the output of the simulator 38, with the trigger reference signal. When the electronic torque signal approaches the value of the reference signal, the trigger circuit is turned off to terminate the output signal to the electronic switch.

The output of the electronic torque simulator is fed to a summing junction 68. The output of the integrator 22 is subtracted from the electronic torque signal at the summing junction 68 and the difference is fed to an initial condition amplifier 70, the output of which is connected through the electronic switch 62 to the input of the integrator 22 via the summing junction 18. Thus, when the trigger circuit 60 and the electronic switch 62 are turned on, the secondary loop is effective in the control circuit. The gain of the initial condition amplifier and the impedances in the summing junction 18 are such that when the electronic switch is on, the initial condition amplifier dominates the integrator input so that the acceleration reference on line 19 and the sun gear acceleration signal on line 16 are ineffective to influence the integrator action. Due to the feedback from the output of the integrator to the summing junction 68, the integrator output is held at the level of the electronic torque signal.

In operation, in the case of a transmission upshift, the solenoid valve 36 prior to initiation of the shift signal from the shift logic 34, is locked in a downshift position by the proper electronic input to the gate 32. The trigger circuit 60 is locked in an on state by a signal from the shift logic circuit rendering the electronic switch 62 conductive. All other inputs to the control system are ineffective since the gate 32 blocks all control signals to the solenoid valve 36. When the shift is initiated, the gate 32 is rendered conductive such that the output of the voltage-to-current converter 30 is transmitted to the solenoid valve 36. Also the shift logic signal is removed from the trigger circuit 60 rendering it responsive to its electronic torque input so that the state of the trigger circuit is dependent on the relative values of the electronic torque signal and the trigger reference signal. At the point of shift initiation, no mechanical changes occur in the transmission. Therefore, electronic torque will be zero and the trigger circuit will remain in its on state maintaining electronic switch 62 conductive. Due to the offset signal, current is applied to the solenoid valve 36 allowing it to flow oil into the torque transmitting device. During the fill phase of the shift, the system is primarily controlled by the electronic torque signal. When the pressure in the torque transmitting device begins to rise to allow the device to have torque capacity, the sun gear will accelerate to produce an acceleration signal on line 16 and consequently effect an electronic torque signal at the output of the torque simulator 38. The electronic torque signal then controls the integrator output voltage to the virtual exclusion of any influence by the acceleration reference and the sun gear acceleration at summing point 18 and the integrator voltage in turn results in decrease of device pressure to control the system output torque. When the electronic torque signal exceeds the trigger reference signal, the trigger circuit 60 is turned off rendering the primary loop operative so that the sun gear acceleration will be controlled to the acceleration reference throughout the remainder of the shift. The trigger circuit is held off for the remainder of the shift. Prior to the triggering, the integrator 22 will have achieved an output voltage very near that required to maintain the output equal and opposite to the acceleration reference signal. Thus a smooth transition from a low gear non-linear system to a high gain virtually linear system is achieved. A similar procedure can be applied during controlled downshifts.

Thus it will be seen that the subject control effects a smooth engagement of the clutch or a brake in a transmission according to a desired rate of acceleration and compensates for the non-linear torque converter characteristics.

The embodiment of the invention described herein is for purposes of illustration and the scope of the invention is intended to be limited only by the following claims:

It is claimed:

1. In a multi-ratio transmission having a driving input member comprising a torque converter, a gear train including a selectively engageable torque transmitting device and a rotatable member which changes in speed during a ratio change, and pressure responsive means for engaging the device for effecting a ratio change, control means regulating the pressure responsive means during engagement of the device for establishing an acceleration of the rotatable member, the control means including circuit means responsive to the acceleration of the rotatable member for deriving a signal simulating the output torque of the gear train, and circuit means effective during the initial ratio change phase for controlling the pressure responsive mean according to the output torque signal and effective after the initial ratio change phase for controlling the pressure responsive means according to a programmed acceleration of the rotatable member.

2. In a multiratio transmission having a driving input member comprising a torque converter having a low response characteristic, a gear train including a selectively engageable torque transmitting device and a rotatable member which changes in speed during a ratio change, and pressure responsive means for engaging the device for effecting a ratio change, control means regulating the pressure responsive means during engagement of the device for establishing an acceleration of the rotatable member, the control means including means for compensating for the low response characteristic of the torque converter comprising a filter circuit responsive to the acceleration of the rotatable member for deriving a signal simulating the output torque of the gear train, and circuit means effective during the initial ratio change phase for controlling the pressure responsive means according to the output torque signal and effective after the initial ratio change phase for controlling the pressure responsive means according to a programmed acceleration of the rotatable member.

3. In a multiratio transmission having a driving input member comprising a torque converter, a gear train including a selectively engageable torque transmitting device and a rotatable member which changes in speed during a ratio change, and pressure responsive means for engaging the device for effecting a ratio change, control means regulating the pressure responsive means during engagement of the device for establishing an acceleration of the rotatable member, the control means including a low gain circuit including a lag network responsive to the acceleration of the rotatable member for deriving a signal simulating the output torque of the gear train, said circuit being effective during the initial ratio change phase for effecting control of the pressure responsive means according to the output torque signal and a high gain circuit effective after the initial ratio change phase for effecting control of the pressure responsive means according to a programmed acceleration of the rotatable member.

4. In a multi-ratio transmission having a driving input member comprising a torque converter, a gear train including a selectively engageable torque transmitting device and a rotatable member which changes in speed during a ratio change, and pressure responsive means for engaging the device for effecting a ratio change, control means regulating the pressure responsive means during engagement of the device for establishing an acceleration of the rotatable member, the control means including a low gain circuit including a lag network responsive to the acceleration of the rotatable member for deriving a signal simulating the output torque of the gear train, said circuit being effective during the initial ratio change phase for effecting control of the pressure responsive means according to the output torque signal, a high gain circuit effective after the initial ratio change phase for effecting control of the pressure responsive means according to a predetermined signal representing a programmed acceleration of the rotatable member, and a circuit responsive to the output torque signal and the predetermined signal for switching control from the low gain circuit to the high gain circuit when output torque signal equals a fixed proportion of the predetermined signal.

* * * * *